(12) United States Patent
Sundet

(10) Patent No.: US 8,231,700 B2
(45) Date of Patent: Jul. 31, 2012

(54) PLEATED FILTER WITH TRIDIRECTIONAL SCRIM

(75) Inventor: Douglas C. Sundet, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 437 days.

(21) Appl. No.: 12/491,308

(22) Filed: Jun. 25, 2009

(65) Prior Publication Data

US 2010/0326028 A1 Dec. 30, 2010

(51) Int. Cl.
  *B01D 39/00* (2006.01)
(52) U.S. Cl. ............ 55/499; 55/487; 55/502; 55/521; 55/510; 55/DIG. 30
(58) Field of Classification Search ........... 55/497–499, 55/502, 521, 528, 485–487, 523–524, 510, 55/DIG. 5, DIG. 30; 428/105, 110, 134, 428/138, 256; 442/352, 353, 381, 387, 388, 442/402, 408, 409
  See application file for complete search history.

(56) References Cited

U.S. PATENT DOCUMENTS

| | | | |
|---|---|---|---|
| 3,446,251 A | 5/1969 | Dow | |
| 3,874,422 A | 4/1975 | Dow | |
| 4,233,350 A * | 11/1980 | Shiflet | 428/110 |
| 4,242,779 A | 1/1981 | Curinier et al. | |
| 5,338,593 A * | 8/1994 | Sasaki et al. | 428/110 |
| 5,540,971 A | 7/1996 | Daurer et al. | |
| 5,814,219 A | 9/1998 | Friedmann et al. | |
| 5,820,644 A | 10/1998 | Mori et al. | |
| 5,908,704 A | 6/1999 | Friedman | |
| 6,056,809 A | 5/2000 | Chapman | |
| 6,299,660 B1 | 10/2001 | Pfeuffer et al. | |
| 6,334,881 B1 * | 1/2002 | Giannetta et al. | 55/486 |
| 6,391,131 B1 | 5/2002 | Newman et al. | |
| 6,521,011 B1 | 2/2003 | Sundet et al. | |
| 6,605,553 B2 * | 8/2003 | Kuroiwa et al. | 442/352 |
| 6,838,163 B2 | 1/2005 | Smith | |
| 7,029,267 B2 | 4/2006 | Caron | |
| 7,235,115 B2 | 6/2007 | Duffy et al. | |
| 7,410,518 B2 | 8/2008 | Sundet | |
| 2004/0185734 A1 | 9/2004 | Gray | |
| 2004/0248488 A1 | 12/2004 | Tebbetts | |
| 2006/0005517 A1 * | 1/2006 | Sundet et al. | 55/497 |
| 2008/0067121 A1 * | 3/2008 | Ter Horst et al. | 210/493.1 |

OTHER PUBLICATIONS

International Search Report, PCT/US2010/039499, Feb. 28, 2011, 4 pages.

* cited by examiner

*Primary Examiner* — Jason M Greene
*Assistant Examiner* — Karla Hawkins
(74) *Attorney, Agent, or Firm* — Kenneth B. Wood

(57) ABSTRACT

Herein is disclosed a pleated filter comprising an upstream face and a downstream face and comprising at least one flexible inextensible tridirectional scrim in discontinuous contact with the downstream face of the pleated filter and bonded to the pleat tips of the downstream face of the pleated filter. In additional embodiments, an additional tridirectional scrim may be provided in discontinuous contact with the upstream face of the pleated filter and bonded to the pleat tips of the upstream face of the pleated filter. In further embodiments, at least one continuous, substantially nonlinear adhesive strand may be provided on at least one face of the pleated filter.

21 Claims, 3 Drawing Sheets

PLEATED FILTER WITH TRIDIRECTIONAL SCRIM

BACKGROUND

Pleated filters are commonly used in air filtration applications. Scrims, adhesives, frames, and the like have been provided on such pleated filters to enhance the physical properties of the pleated filter.

SUMMARY

Herein is disclosed a pleated filter comprising an upstream face and a downstream face and comprising at least one flexible inextensible tridirectional scrim in discontinuous contact with the downstream face of the pleated filter and bonded to the pleat tips of the downstream face of the pleated filter. In additional embodiments, an additional tridirectional scrim may be provided in discontinuous contact with the upstream face of the pleated filter and bonded to the pleat tips of the upstream face of the pleated filter. In further embodiments, at least one continuous, substantially nonlinear adhesive strand may be provided on at least one face of the pleated filter.

Thus in one aspect, herein is disclosed a pleated filter comprising an upstream face and a downstream face, the filter comprising filter media with a plurality of oppositely-facing pleats comprising a plurality of upstream pleat tips and upstream pleat valleys and downstream pleat tips and downstream pleat valleys, the filter further comprising at least a first tridirectional, flexible, inextensible scrim in discontinuous contact with the downstream face of the filter and bonded to at least some of the downstream pleat tips.

These and other aspects of the invention will be apparent from the detailed description below. In no event, however, should the above summaries be construed as limitations on the claimed subject matter, which subject matter is defined solely by the attached claims, as may be amended during prosecution.

Like reference symbols in the various figures indicate like elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", "bottom", "upper", "lower", "under", "over", "front", "back", "outward", "inward", "up" and "down", and "first" and "second" may be used in this disclosure, it should be understood that those terms are used in their relative sense only unless otherwise noted.

DETAILED DESCRIPTION

Figure 1:
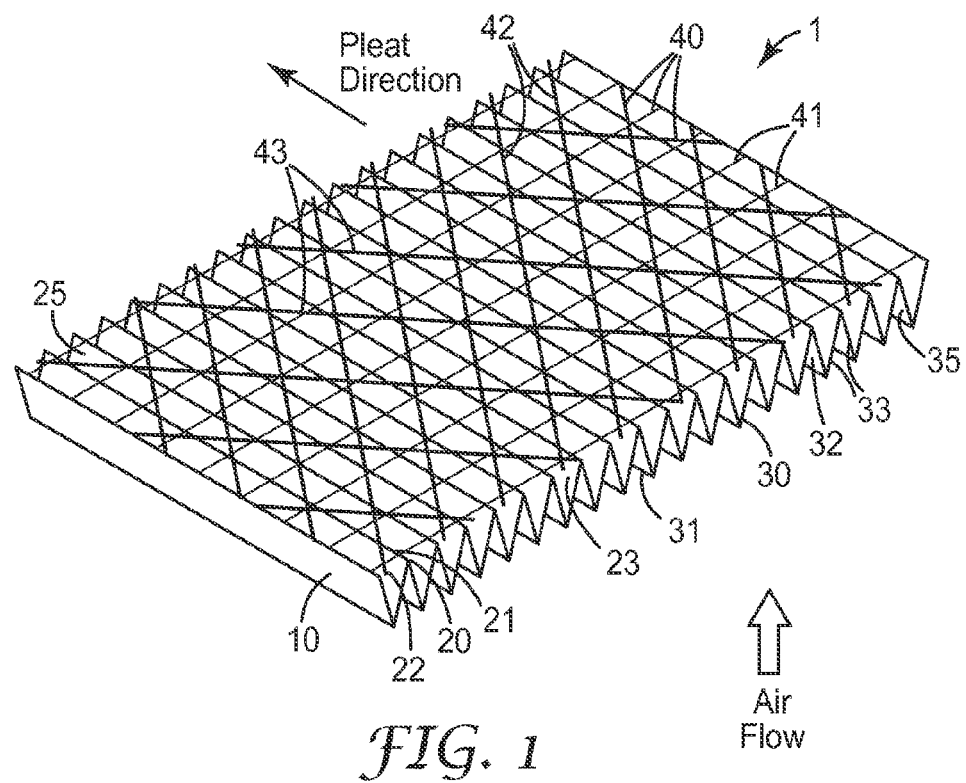
FIG. 1 is a perspective view of the downstream face of an exemplary pleated filter comprising an exemplary tridirectional scrim.
Figure 2:
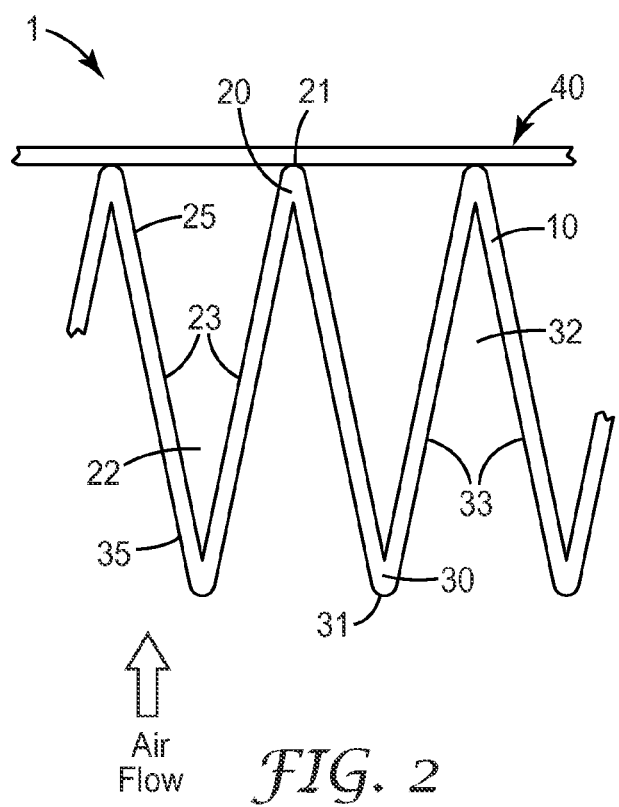
FIG. 2 is a side schematic cross sectional view of an exemplary pleated filter comprising an exemplary tridirectional scrim on the downstream face of the pleated filter.

Shown in FIG. 1 in perspective view, and in FIG. 2 in side schematic cross sectional view, is an exemplary pleated filter 1 comprising an exemplary tridirectional scrim 40. In FIG. 1, filter 1 is viewed from the downstream side of the filter, with the upstream side being defined as the side from which, in use of filter 1, flowing air impinges on the filter, and the downstream side being the side on which air exits the filter. (Such filters are often marked by the manufacturer to identify the upstream and downstream sides, in order that the filter be installed in the proper orientation, e.g., in an HVAC system).

Pleated filter 1 comprises pleated filter media 10 and comprises a downstream face 25 and an upstream face 35. Pleated filter media 10 comprises a plurality of upstream pleats 30, oriented in generally parallel relation to each other. Each upstream pleat 30 comprises an upstream pleat tip 31 and each adjacent pair of upstream pleats 30 defines an upstream pleat valley 32 therebetween. Flowing air may pass into upstream valley 32 and into upstream pleat walls 33 so as to penetrate into filter media 10. Pleated filter media 10 further comprises a plurality of downstream pleats 20, in generally parallel relation to each other and in oppositely-facing configuration from upstream pleats 30. Each downstream pleat 20 comprises a downstream pleat tip 21 and each adjacent pair of downstream pleats 20 defines a downstream pleat valley 22 therebetween. Flowing air may pass out of downstream pleat walls 23 so as to exit filter media 10.

Pleated filter 1 further comprises at least one tridirectional scrim 40, which is provided on at least one face of pleated filter 1 by way of at least a portion of at least some of the filaments of scrim 40 being bonded to at least a portion of at least some of the pleat tips of one face of filter 1. Tridirectional scrim 40 as disclosed herein is not pleated in common with filter media 10. Rather, scrim 40 comprises a generally planar configuration and is thus spaced apart from the majority of the area of the pleat walls to which scrim 40 is adjacent (although some slight sagging of scrim 40 into the pleat valleys may occur). Tridirectional scrim 40 is thus in discontinuous contact with the face of pleated filter 1 (i.e., with the material of pleated filter media 10) to which scrim 40 is adjacent.

In the exemplary embodiment shown in FIG. 1, tridirectional scrim 40 is provided on the downstream side of pleated filter 1, in discontinuous contact with downstream face 25 of pleated filter 1, with at least a portion of at least some of the filaments of scrim 40 being bonded to at least a portion of at least some of the downstream pleat tips 21 of pleated filter 1. Other configurations are possible, as disclosed later herein.

Figure 3:
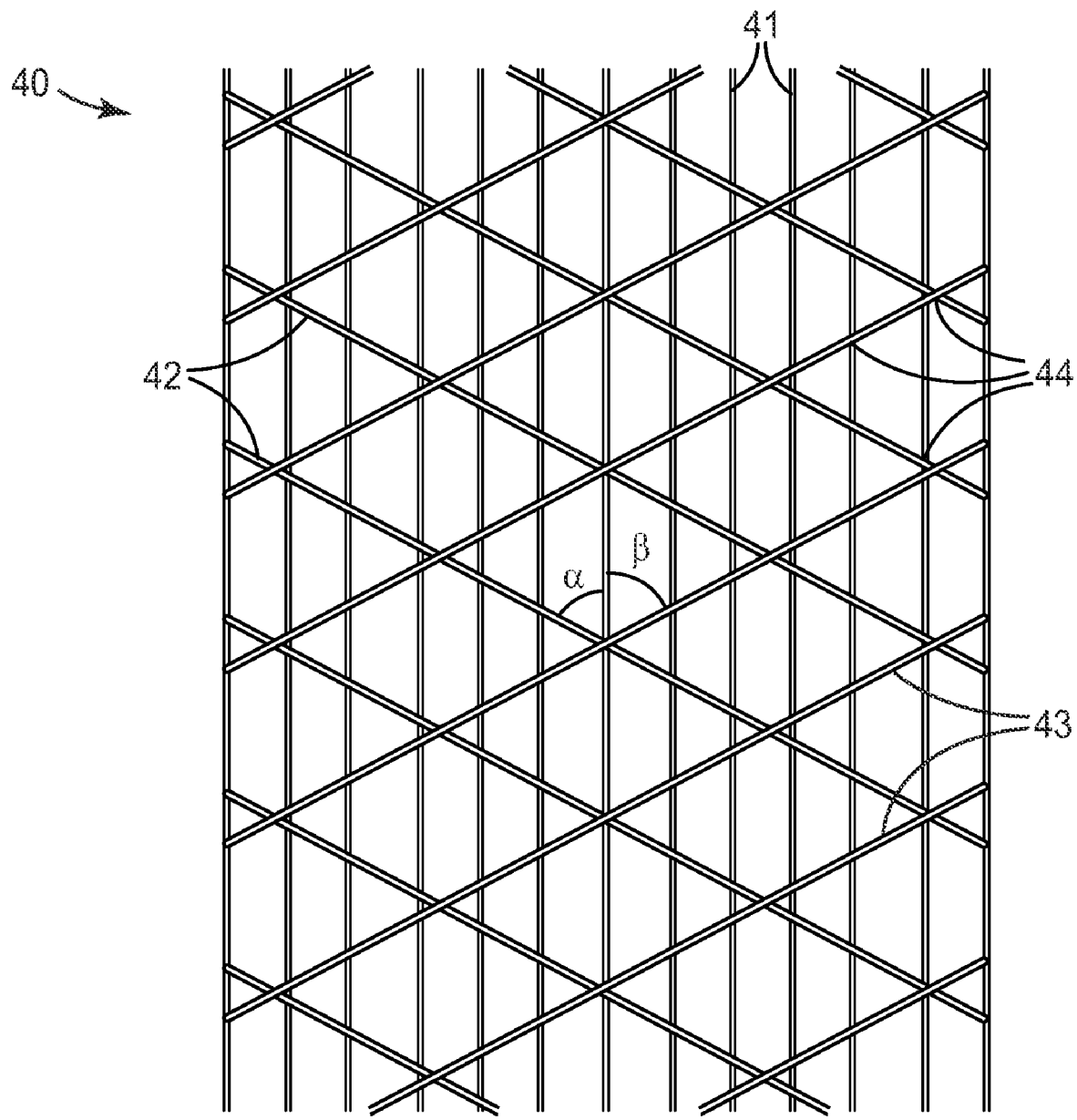
FIG. 3 is a top view of an exemplary tridirectional scrim.

An exemplary tridirectional scrim 40 is shown in top view in FIG. 3. Tridirectional scrim 40 is defined as comprising a first set of generally parallel filaments 41. When scrim 40 is attached to pleated filter media 10 to form pleated filter 1, first set of filaments 41 will be oriented generally perpendicular to (e.g., within +/−about 5 degrees of 90 degrees to) the pleat direction of pleated filter 1 (with pleat direction meaning a direction parallel to pleat tips 21 and 31, as signified by the arrow in FIG. 1). Such an orientation is shown in FIG. 1. Tridirectional scrim 40 is further defined as comprising a second set of generally parallel filaments 42, which are oriented at an angle (α) of between about 20 negative degrees and about 80 negative degrees from the first set of filaments 41 (with negative degrees meaning an angle progressing counterclockwise from the orientation of first set of filaments 41). Tridirectional scrim 40 is further defined as comprising a third set of generally parallel filaments 43, which are oriented at an angle ($\beta$) of between about 20 positive degrees and about 80 positive degrees from the first set of filaments 41 (with positive degrees meaning an angle progressing clockwise from first set of filaments 41).

The filaments comprising tridirectional scrim 40 are generally continuous (with terminal ends that, in use, may generally coincide with the terminal edges of filter media 10) and generally straight (e.g., except for such variations in continuity and/or linearity as are known by those of ordinary skill in the art to be inherent in the production and use of such materials).

Tridirectional scrim 40 comprises a flexible inextensible scrim. The inventor has found that such tridirectional flexible, inextensible scrims can be advantageously used with pleated filters as disclosed herein. Specifically, such use may take more full advantage of the inextensibility of essentially all of the filaments of the scrim, in a manner not heretofore taught in the art. Specifically, the inventor has discovered the source of a problem with the use of conventional bidirectional (e.g. with first and second sets of filaments, in a square or rectangular pattern) scrims (such conventional bidirectional scrims may be seen e.g. in FIGS. 4 and 6 of U.S. Patent Application 2008/0067121 and in FIG. 9 of U.S. Pat. No. 7,503,953). Such bidirectional scrims are conventionally bonded to the pleat tips of a pleated filter with a first set of filaments of the scrim generally perpendicular to the pleat direction of the pleated filter (as shown in the above-cited documents). In this configuration this first set of filaments is most optimally positioned to resist expansive deformation (e.g., undesired deformation by at least partial unfolding) of the pleated filter (e.g., when the filter is under pressure of an airstream impinging on the upstream face of the filter). However, the second set of filaments, being conventionally oriented perpendicular to the first set of filaments, is oriented generally parallel to the pleat direction and so contributes little or no resistance to expansion. That is, the majority of the filaments of the second set of filaments do not contact a pleat tip (except for an occasional filament that may coincide with a single pleat tip) and in particular do not contact multiple pleat tips so that they can assist in minimizing or preventing expansive deformation of the pleated filter. In essence, the second set of filaments is mainly present to provide a usable scrim, e.g. so that the first set of filaments can be attached to the filter in the form of a scrim, in one operation, rather than individual filaments of the first set of filaments being singly and/or separately attached. Such conventional bidirectional scrims thus in general fail to provide any more resistance to expansive deformation of the pleated filter than is supplied by the first set of filaments of such a bidirectional scrim.

The inventor has discovered that use of a tridirectional scrim as disclosed herein can alleviate this problem. The use of a tridirectional scrim allows a first set of filaments (e.g., filaments 41) to be oriented generally perpendicular to the pleat direction (as shown in FIG. 1), as with a conventional bidirectional scrim. However, with a tridirectional scrim, the filaments of the second set (e.g., filaments 42 of FIG. 1), and the filaments of the third set (e.g., filaments 43 of FIG. 1), will extend (bridge) across multiple pleats, and will be bonded to the pleat tips thereof (e.g., as seen in FIG. 1). Thus, the second and third sets of filaments will contribute to resisting expansive deformation (e.g., unfolding) of the pleated filter (e.g., under pressure of an airstream impinging on the upstream face of the filter). Thus, according to the disclosures herein, the presence and inextensibility of essentially all of the filaments of a scrim may be more effectively utilized in stabilizing and strengthening the pleated filter (e.g., against expansive deformation).

While the above-discussed deficiencies with conventional bidirectional scrims might in theory be rectified by changing (rotating) the orientation of a conventional bidirectional scrim, such change would rotate the first set of filaments away from being aligned generally perpendicular to the pleat direction, even as it rotated the second set of filaments more toward being aligned generally perpendicular to the pleat direction. Thus, no net benefit in resistance of the pleated filter to expansive deformation might be expected to result. In fact, in such a rotated configuration in which no set of filaments is aligned directly perpendicular to the pleat direction, the degree to which a bidirectional scrim would stabilize a pleated filter against expansive deformation might actually decrease (since such expansion of the pleats might be allowed simply via distortion of the angles between filaments of the first and second sets rather than necessitating elongation of individual filaments). In addition, such a rotated configuration would be expected by those of skill in the art to make it necessary to attach scrims to pleated filters piecewise, rather than bringing the scrim in from a continuous roll (since such bidirectional scrims are typically manufactured with at least one set of filaments oriented generally in the machine direction of the scrim). Such a disadvantage would be likely found unacceptable for low-cost manufacturing.

In contrast, use of a tridirectional scrim as disclosed herein preserves the above-described optimal alignment of the first set of filaments of the scrim directly perpendicular to the pleat direction, while allowing the second and third sets of filaments of the scrim to also assist in stabilizing the pleated filter against expansive deformation. In addition, because such tridirectional scrims are usually supplied with the first set of filaments oriented downweb, such a tridirectional scrim can easily be supplied as a continuous roll.

The inventor has also discovered that the use of tridirectional scrims may have pleasing aesthetic effects. In conventional bidirectional scrims, the second set of filaments is typically oriented generally parallel to the pleat direction. Any small deviation in the orientation of a filament of this set away from being parallel to the pleat tip of a nearby pleat (e.g. as may be expected to occur occasionally in the handling and bonding of such scrims to a pleated filter) may result in a displeasing visual appearance. Even in the absence of this, the different distances between various filaments and adjacent pleat tips (unless the filament spacing and pleat spacings are identical) may be aesthetically displeasing. Tridirectional scrims as disclosed herein do not comprise a set of filaments that are so closely aligned with the pleat direction, and thus do not suffer from this drawback. Further, since the second and third sets of filaments are oriented at an angle to the pleat direction, any deviations from the nominal orientation may not be as noticeable.

In use of a pleated filter (e.g. in an HVAC system), when an airstream impinges on the upstream face of the filter the upstream face of the filter tends to experience mainly compressive force and the downstream face of the filter tends to experience mainly expansive force (e.g., the filter tends to bow in the direction that force is applied by the airstream). Thus, if a single tridirectional scrim as disclosed herein is used, it may most advantageously be provided on the downstream side of the pleated filter so as to most effectively utilize the inextensibility of the filaments in resisting expansive deformation of the pleated filter. However, in some embodiments, two tridirectional scrims may be used, one on the downstream side of the pleated filter and one on the upstream side.

Scrim 40 is flexible and inextensible. Inextensible as defined herein encompasses any material that does not have the relatively high extensibility (characterized e.g. by an elongation at break of 200% or more) characteristic of elastic materials such as natural rubber, SBR rubber, lycra, etc. Thus, common polymeric materials, e.g., polyethylene terephthalate and the like, may be used to form the inextensible scrims disclosed herein (and may, in various embodiments, display an elongation at break of less than about 120%, less than about 60%, less than about 20%, or less than about 10%). Practically speaking, such inextensibility means that the filaments of the scrim will not extend or elongate to any significant extent (e.g., more than about 5%) under the forces commonly present in the handling of pleated filters and their exposure to a typical airstream. Inextensible as defined herein further means that, when attached to filter 1, scrim 40 comprises at least a first set of filaments that are aligned generally perpendicular to the pleat direction of filter media 10, in order that the above-described inextensibility of at least the first set of filaments of scrim 40 is optimally able to assist in minimizing or preventing expansive deformation of pleated media 10. Inextensible as defined herein does not encompass scrims which, in use, do not comprise at least such a first set of optimally aligned filaments. (As mentioned above, scrims that lack at least a first set of optimally aligned filaments may be extensible simply by the ability of the scrim to be extended by way of distortion of the angles between filaments of the various sets, regardless of whether or not the filaments of the scrim are made of inextensible materials). Thus, scrims such as the above-described conventional bidirectional scrims that are rotated away from having a first set of filaments perpendicular to the pleat direction, are not inextensible as defined herein. Additionally, metal scrims (which may include e.g. screens, meshes, expanded metal, etc.) that do not comprise such an optimally oriented first set of filaments, are not inextensible as defined herein (an example of such a metal scrim that does not qualify as inextensible can be seen in FIG. 6 of U.S. Pat. No. 7,235,115).

Flexible as defined herein means that scrim 40, and the individual filaments thereof, can be easily and reversibly bent, curved, rolled up on itself, etc. Such flexible scrims often are drapeable, meaning that if the scrim is held in a horizontal orientation with only a portion of it supported, some or all of the unsupported portions (e.g., that extend a few inches away from the supported portions) will deform downwards under the influence of gravity.

The filaments of scrim 40 may be made of any material as long as the material, in combination with the dimensions (e.g., width, thickness) of the filament, provides the desired combination of flexibility and inextensibility. Such materials may include organic polymeric materials (whether naturally occurring or synthetic), inorganic materials (e.g., fiberglass, as discussed below), metals, and so on.

Filaments of scrim 40 may comprise unitary monolithic filaments (e.g., extruded polymeric filaments, strips of metal, etc.). In some embodiments, the filaments of scrim 40 may be comprised of multiple fibers (which, in a given filament, may be oriented generally parallel to the long axis of the filament). Such fibers may include for example synthetic polymeric fibers such as polyethylene terephthalate; or, the filaments may be comprised of natural fibers, which may include paperlike materials, cardboard, and the like. In some embodiments, the filaments comprise fiberglass fibers. In particular embodiments, scrims may comprise both fiberglass-based filaments and polymeric (e.g., polyester) based filaments. Whether e.g., fiberglass, polymeric, etc., such bundles of fibers may be held together to form a filament by the use of one or more binder materials. Suitable binder materials may include e.g. natural rubber latex, styrene-butadiene rubber latex, ethylene vinyl acetate, plasticized PVC, polyvinyl alcohol, and the like. The individual fibers of the filament may be individually coated (e.g., with similar materials as listed above), with such coatings serving as protection and/or as the above-mentioned binder materials.

The individual filaments of scrim 40 may comprise any suitable shape when viewed in cross section, (e.g., generally round, square, etc.). In a specific embodiment, the filaments of scrim 40 comprise a generally "flattened" (e.g., oblong or even rectangular) configuration when viewed in cross section. Such a configuration may provide a relatively wide area (e.g., of one of the major surfaces of a rectangular shaped filament) to enhance the bonding of the filament to a pleat tip. In various embodiments, the filaments of scrim 40 may comprise a generally flattened configuration with a filament width of from about 0.2 mm to about 2 mm. In some embodiments, the filaments of all three sets are of the same width. In other embodiments, the filaments of first set of filaments 41 may comprise a different width than those of second and third sets 42 and 43. In specific embodiments, the filaments of first set 41 may be narrower than those of the second and third sets (e.g., as shown in FIG. 3). In further embodiments, the filaments of first set 41 may be less than about 50% as wide as those of the second and third sets.

The various sets of filaments can comprise suitable spacings between individual filaments as desired. In various embodiments, the filament spacing can be at least about 4 mm, at least about 7 mm, or at least about 10 mm. In additional embodiments, the filament spacing can be at most about 50 mm, at most about 25 mm, at most about 15 mm, or at most about 10 mm. In various embodiments, the spacing of the filaments of first set of filaments 41 can be different from the spacing of those of the second and third sets. In specific embodiments, the spacing of the filaments of first set of filaments 41 is less than that of the second and third sets (e.g., as shown in FIG. 3). In further embodiments, the spacing of the filaments of first set of filaments 41 is less than about 50% of the spacing of the second and third sets. The filament spacings of any of the filament sets can be relatively constant or can be varied. Some inherent variation in filament spacing may occur in production and handling of such tridirectional scrims, of course.

Within the limits established previously herein, the orientation of second and third sets of filaments 42 and 43 relative to first set of filaments 41 can be chosen as desired. In various embodiments, second set of filaments 42 may be oriented at an angle (α) of greater than about 40, or greater than about 60, negative degrees from first set of filaments 41. In various embodiments, third set of filaments 43 may be oriented at an angle (β) of greater than about 40, or greater than about 60, positive degrees from first set of filaments 41. In additional embodiments, second set of filaments 42 may be oriented at an angle (α) of less than about 76, less than about 50, or less than about 30, negative degrees from first set of filaments 41. In additional embodiments, third set of filaments 43 may be oriented at an angle (β) of less than about 76, less than about 50, or less than about 30, positive degrees from first set of filaments 41. In some embodiments, second and third filaments sets 42 and 43 are oriented symmetrically with respect to first set 41 (i.e., with the orientation angle (α) of filament set 42 in negative degrees being generally equal to the orientation angle (β) of filament set 43 in positive degrees). In alternative embodiments, second and third filament sets 42 and 43 are oriented asymmetrically with respect to first set 41.

Regardless of the specific arrangements, a suitable tridirectional scrim 40 will comprise a highly open structure (in various embodiments comprising greater than at least 80, 90, or 95% open area) so as to allow sufficient airflow through pleated filter 1.

In various embodiments, tridirectional scrim 40 comprises a basis weight of from about 10 grams per square meter to about 50 grams per square meter, or from about 20 grams per square meter to about 30 grams per square meter.

The filaments of scrim 40 can be arranged in a tridirectional configuration in any suitable manner. For example, the filaments can be arranged by weaving, knitting, and the like. Any suitable pattern (e.g., plain weaving, basket weaving, twill weaving, satin weaving, etc.) may be used as long as it is compatible with the formation of a tridirectional scrim as defined herein. Rather than e.g. weaving (e.g., passing individual filaments alternatively over and under each other), it may be possible to simply lay sets of filaments atop other sets of filaments (e.g., not in a woven manner) and bond the filaments together at crossover points 44.

Regardless of the specific arrangement, the individual filaments of scrim 40 will be bonded to each other at least at some crossover points 44 of the filaments, in order to stabilize the tridirectional arrangement of the filaments so that the scrim can be handled etc. Typically, adhesives, binders or the like can be used for such purpose, as is well known in the art.

Suitable flexible, inextensible tridirectional scrims include for example the products available from St. Gobain Technical Fabrics America (Albion, N.Y.) under the trade designations TGD 5412 and TQVX 3210. Examples of other tridirectional scrims which may be used include TQV 3310, TGC 2310, TGD 2211, and TGCD 2321, from Saint Gobain Technical Fabrics America; 077118, 077144 and 077119 from Milliken & Co (Milliken, S.C.); and TR002 G from Dewtex, Inc. (Eastanollee, Ga.).

Tridirectional scrim 40 is applied to pleated filter media 10 to form pleated filter 1. Filter media 10 may be pleated according to methods well known to those of skill in the art. Filter media 10 may be paper; porous films of thermoplastic or thermoset materials; nonwoven, such as melt blown or spunbond, webs of synthetic or natural fibers; scrims; woven or knitted materials; foams; electret or electrostatically charged materials; fiberglass media; or laminates or composites of two or more materials. A nonwoven polymeric web of polyolefin, polyethylene or polypropylene is suitable, for example. Filter media 10 may also include sorbents, catalysts, and/or activated carbon (granules, fibers, fabric, and molded shapes). Electret filter webs can be formed of the split fibrillated charged fibers as described in U.S. Pat. RE 30,782. These charged fibers can be formed into a nonwoven web by conventional means and optionally joined to a supporting scrim such as disclosed in U.S. Pat. No. 5,230,800 forming an outer support layer. Alternatively, filter media 10 can be a melt blown microfiber nonwoven web, such as disclosed in U.S. Pat. No. 4,813,948 which can be joined to a support layer during web formation as disclosed in that patent, or subsequently joined to a support web in any conventional manner.

Laminated media can also be used as filter media 10. Such media may consist of laminated layers of the media discussed above or of other substrates laminated to one or more layers of filter media, for example. In some embodiments, a prefilter layer may be used on the upstream side of filter media 10. Such a prefilter layer may comprise polypropylene, polyethylene, polyethylene terephthalate, or blends of these materials. In addition to the tridirectional scrim or scrims disclosed herein, if desired an additional scrim (which may be any suitable scrim including a conventional bidirectional scrim, a nonwoven scrim, etc.) can be used on the upstream and/or downstream face of filter media 10. Such a scrim may be flush against (e.g. bonded in its entirety to) the face of the filter media and pleated along with filter media 10.

Pleated filter media may comprise any suitable pleat spacing. In various embodiments the tip to tip spacing (e.g., between successive pleat tips on a given face of the filter media) may be at most about 25 mm, at most about 12 mm, or at most about 7 mm. In further embodiments, the tip to tip spacing may be at least about 3 mm or at least about 5 mm.

Tridirectional scrim 40 can be applied to a face of pleated filter media 10, and bonded to at least some of the pleat tips thereof, by any suitable method. For example, scrim 40 may be obtained as a continuous roll, a bonding adhesive (not shown in any figure) applied thereto (e.g., by coating the adhesive onto a surface of the filaments of the scrim), and portions of scrim 40 then held against pleat tips of the pleated filter media so as to cause bonding between the portions of the filament and portions of the pleat tips that are in contact with each other. In some embodiments, the bonding adhesive may for example be a hot melt adhesive in which case scrim 40 may then be applied to pleated filter media 10 with the adhesive in at least a semimolten condition and the adhesive allowed to cool and solidify and in so doing bond scrim 40 to pleated filter media 10. In some embodiments, adhesive 40 may comprise pressure sensitive adhesive properties after it is solidified, such that it may not have to be in an at least semimolten condition to achieve a bond. In specific embodiments, the filaments of scrim 40 comprise a generally flattened cross sectional shape with the adhesive being applied to a major surface of the filaments.

Scrim 40 may be brought into contact with pleated filter media 10 with the width of scrim 40 generally corresponding to one dimension of the finished filter 1. After bonding, the edges of scrim 40 and/or pleated filter media 10 may be trimmed or cut to the desired final dimension. Pleated filter 1 may be used in this configuration. Or, a frame may be provided. For example, a frame member may be positioned at each edge of filter 1. Often such frame members each comprise a U-shaped channel (e.g., made of cardboard, metal, plastic, etc.) which covers at least a portion of each of the upstream face and the downstream face of the pleated filter. An adhesive may be applied between the perimeter of the filter media and the frame members In this manner pleated filter 1 may be provided comprising at least one tridirectional scrim. In some embodiments, pleated filter 1 may be symmetrical in construction and/or appearance (e.g., with a tridirectional scrim on both faces of the filter). In such case the filter may not comprise readily identifiable upstream and downstream faces until use (when the filter is placed into an airstream).

Pleated filter 1 may be self-supporting, which in the present context means that filter media 10 does not unacceptably bow, collapse or otherwise deform when subjected to the air pressure typically encountered in forced air ventilation systems. In some embodiments, filter 1 comprises a planar overall shape (e.g., rather than a cylindrical shape), e.g., as shown in FIG. 1.

In some embodiments, filter 1 may include at least one continuous, substantially nonlinear adhesive strand 50 provided on a face of filter 1 that contacts filter media 10 at least at some of the pleat tips of that face of filter 1 and that penetrates at least partially into at least some of the pleat valleys of that face of filter 1. In this context, substantially nonlinear refers to the nonlinear (e.g., zig-zag) shape of strand 50 when viewed in a side view as in FIG. 4. In some embodiments, adhesive strand 50 is in continuous contact with filter media 10. In other embodiments, adhesive strand 50 is in discontinuous contact with filter media 10. In this context, discontinuous contact denotes a case in which adhesive strand 50 contacts filter media 10 at least at some of the pleat tips and penetrates only partially into at least some of the pleat valleys so that bridging portion 51 of adhesive strand 50 bridges over a portion of at least some pleat valleys (as shown in exemplary manner in FIG. 4) rather than contacting the pleat wall down to the terminal end of these valleys. Depending on the depth of penetration of adhesive strand 50 into a pleat valley (and the amount to which the pleats are compressed together after the deposition of adhesive strand 50, as described later herein), bridging portion 51 may not appear exactly as shown in FIG. 4; e.g., it may be at least partially flattened between the pleat walls.

Figure 4:
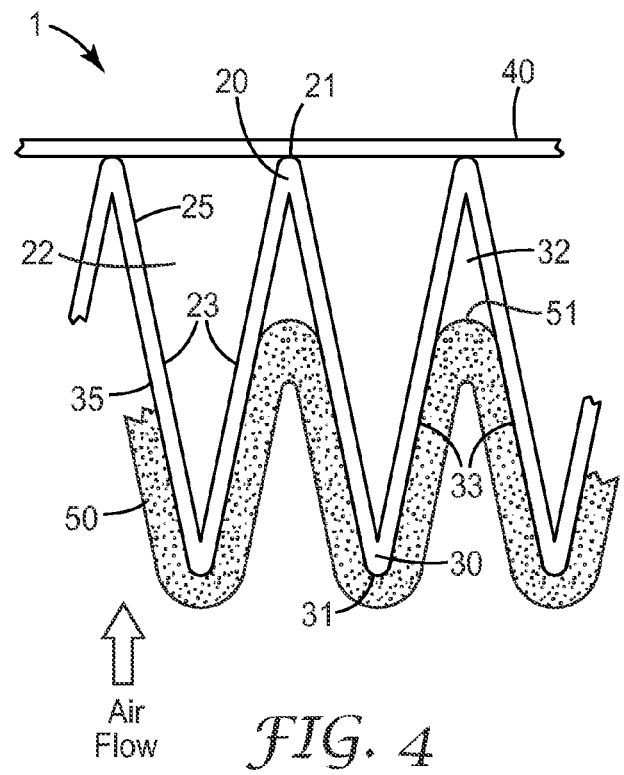
FIG. 4 is a side schematic cross sectional view of an exemplary pleated filter comprising an exemplary tridirectional scrim on the downstream face of the pleated filter and an exemplary adhesive strand on the upstream face of the filter.

In one embodiment adhesive strand(s) 50 is oriented in a direction generally perpendicular to the pleat direction (e.g., so that is successively traverses pleat tips and valleys), as shown in FIG. 4. One, two or more strands can each be applied to a face of the filter (e.g., in a generally parallel configuration).

Figure 5:
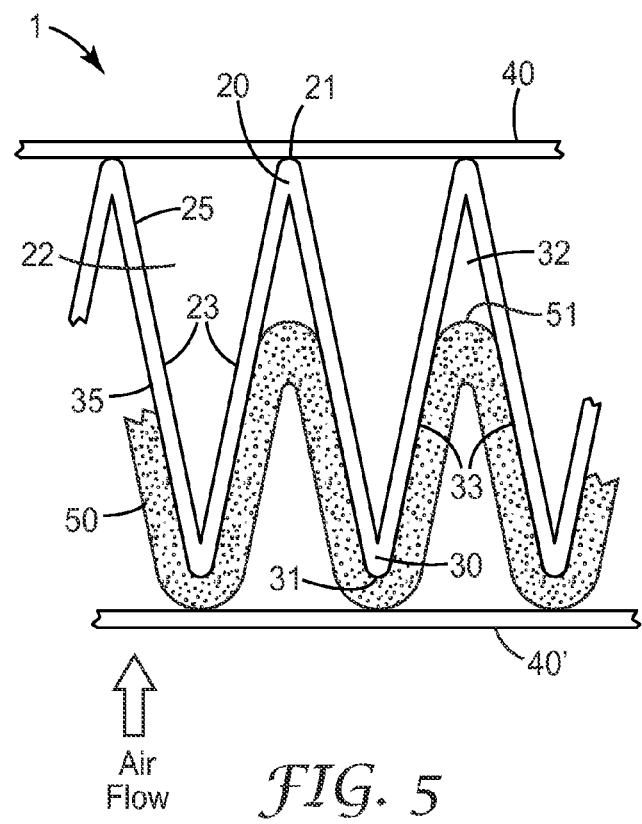
FIG. 5 is a side schematic cross sectional view of an exemplary pleated filter comprising an exemplary tridirectional scrim on the downstream face of the pleated filter and an exemplary adhesive strand on the upstream face of the filter and another exemplary tridirectional scrim on the upstream face of the pleated filter.

Adhesive strand 50 can perform several useful functions in enhancing the stabilizing of pleated filter 1. Adhesive strand 50 may at least partially prevent adjacent pleat tips to which adhesive strand 50 is attached from moving toward each other when the face of the pleated filter to which adhesive strand 50 is attached experiences compressive force (i.e., adhesive strand(s) 50 may act as spacer(s) to at least partially prevent the collapse of a pleat valley in which the adhesive strand is present). Accordingly, in some embodiments at least one adhesive strand may be provided on upstream face 35 of pleated filter 1 (which may be advantageous since the upstream side of filter 1 may experience the highest compressive force when filter 1 is exposed to an airstream, as discussed earlier herein). Thus in the exemplary embodiment shown in FIG. 4, tridirectional scrim 40 is provided on downstream face 25 of filter 1 (and is bonded to downstream pleat tips 21), and adhesive strand 50 is provided on upstream face 35 of filter 1. In further embodiments, shown in exemplary manner in FIG. 5, a second tridirectional scrim 40' (which may be identical to, or a different design from, tridirectional scrim 40) may be present on upstream face 35 of filter 1. In such an embodiment, the flexibility of scrim 40 and the filaments thereof may advantageously allow some filaments to bond to the outward-facing surface of an adhesive strand 50 where adhesive strand 50 crosses a pleat tip (as shown in a representative manner in FIG. 5), while other (e.g., nearby) filaments may still be able to bond directly to pleat tips 31.

Adhesive strand 50 may at least partially prevent adjacent pleat tips to which adhesive strand 50 is attached from moving away from each other when the face of filter 1 to which adhesive strand 50 is attached experiences expansive force. That is, adhesive strand(s) 50, by virtue of being attached to adjacent pleat tips and at least a small area of pleat walls in proximity thereto, may prevent movement of pleat tips away from each other. Accordingly, in some embodiments at least one adhesive strand 50 is provided at least on downstream face 25 of pleated filter 1 (which may be advantageous since the downstream side of filter 1 may experience the highest expansive force when filter 1 is exposed to an airstream, as discussed earlier herein), in addition to tridirectional scrim 40 being provided on downstream face 25 of pleated filter 1. In additional embodiments, a second tridirectional scrim 40' (which may be identical to, or a different design from, tridirectional scrim 40) may be present on upstream face 35 of filter 1.

In still further embodiments, at least a second adhesive strand 50' may be present on upstream face 35 of pleated filter 1, in addition to the at least one adhesive strand 50 on downstream face 25 of pleated filter 1, with tridirectional scrim 40 being present at least on downstream face 25 of pleated filter 1. In specific embodiments of this type, a second tridirectional scrim 40' may be present on upstream face 35 of filter 1 (thus in such embodiments filter 1 comprises at least one adhesive strand on the upstream and downstream faces, and comprises a tridirectional scrim on the upstream and downstream faces).

The application of adhesive strand 50 to a pleated filter 1 may be accomplished by various techniques, including drizzling a continuous bead of molten adhesive onto pleated filter media 10 from an applicator. Adhesive strand 50 may then be allowed to harden. In various embodiments, this application may be performed with pleated filter media 10 held by a variable-pitch positioning device (e.g., a variable pitch screw on a rotating spindle). Such processing may allow the molten adhesive to be applied with the pleats at a particular spacing, and the pleat spacing then altered before or during the hardening of the adhesive. The pleat spacing may be decreased after application of the adhesive (which may be particularly useful in the production of filters with a relatively small (e.g., less than 10 mm, possibly as small as 5 mm) pleat spacing (distance between adjacent pleat tips). Or, the pleat spacing may be increased after application of the adhesive (which may be particularly useful in the production of filter with a relatively large pleat spacing).

Adhesive strand 50 may be composed of a wide range of suitable adhesives which bond to filter media 10 and offer structural support to the media. In some embodiments, hot-melt and foamed hot-melt adhesives may be preferred because they can easily be applied to in a molten state and then cured, hardened, or cross-linked (e.g., after the pleat spacing is altered). Suitable adhesives may include for example an adhesive having between about 5% and about 10% paraffin wax and between about 10% and about 30% polyethylene wax. In some embodiments, the adhesive has a viscosity of about 5,600 centipoise (cP) at 121 degrees C. (250 degrees F.). Another suitable adhesive is available from 3M Company under the tradename 3748; it has a viscosity of about 5000 cP (Brookfield Thermoset Viscometer in centipoise) at 190.6 degrees C. (375 degrees F.). Yet another suitable adhesive is an ethyl vinyl acetate based hot melt adhesive with a viscosity of about 10,500 cP at 148.9 degrees C. (300 degrees F.). In some embodiments, a suitable adhesive has a set rate of less than about 3 minutes for a 3.18 mm (⅛ inch) diameter bead and preferably has a set rate of less than about 45 seconds.

Further details and configurations of adhesive strand 50, suitable adhesive materials, and methods and apparatus for applying adhesive strand 50 to a pleated filter, including the use of variable-pitch positioning devices, can be found in U.S. Pat. No. 7,235,115 to Duffy, which is incorporated by reference herein for this purpose.

In embodiments in which adhesive strand 50 is to be present on the same face of filter 1 as tridirectional scrim 40, adhesive strand 50 may be applied to filter 1 using the methods discussed herein and discussed in further detail in U.S. Pat. No. 7,235,115, and tridirectional scrim 40 may be bonded to filter 1 using the methods disclosed herein. It may be optimum to apply adhesive strand 50 first (and to establish the final desired pleat spacing), and apply tridirectional scrim

40 thereafter. In such cases, some filaments of scrim 40 may bond to adhesive strand 50, and others may bond to pleat tips (relying on the flexibility of the filaments of scrim 40 to make this possible, as discussed earlier herein).

In various embodiments, tridirectional scrim 40 may be used (e.g., on one side of filter 1), with a stiff support (e.g., a metal, plastic, or paperboard screen, mesh, or perforated layer) on the opposite side of filter 1.

EXAMPLES

Lengths of filter media were obtained that were approximately 20 inches wide. The filter media was a nonwoven web having substantially aligned fibers, of the general type described in U.S. Pat. No. 6,858,297. Continuous, substantially nonlinear adhesive strands were applied to the media, by methods and apparatus similar to those described in U.S. Pat. No. 7,235,115. Specifically, the media was processed on a rotary-score pleater to form parallel, crossweb score lines in the media, at a spacing of approximately 22 mm (⅞ inches). The media was then folded along the score lines and gathered so that the pleats were stacked tightly together. The pleats were then inserted into a variable pitch screw which expansively unfolded the filter media so that the pleat tip to pleat tip spacing was about one inch. Using hot melt adhesive dispensing nozzles mounted above the media, strands of molten hot melt adhesive were applied to what would become (in use) the upstream face of the filter media. Nine continuous, substantially nonlinear adhesive strands were applied, each strand oriented in a direction perpendicular to the pleat lines. The strands were spaced across the 20-inch width of the filter media at a spacing between adjacent adhesive strands of approximately 2 inches. After having adhesive strands deposited thereon and prior to the adhesive hardening, the sections of pleated filter media bearing adhesive strands thereon were moved (by rotating the variable pitch screw) to a section of the variable pitch screw in which the pleat tips were held at a spacing of approximately 5 mm. The adhesive was allowed to harden while the pleats were held at this spacing. In this manner lengths of filter media were obtained bearing continuous, substantially nonlinear adhesive strands.

A tridirectional scrim was obtained from St. Gobain Technical Fabrics under the trade designation TGD 5412/A15/44. One side of the scrim (i.e., one major surface of the filaments of the scrim) was coated with hot melt adhesive using a manual hot melt roll coater. The tridirectional scrim was then oriented so that the filaments of the first set of filaments of the scrim (of the type exemplified by filaments 41 described herein) were oriented perpendicular to the pleat lines. While the adhesive was still at least partially molten, the adhesive-bearing side of the scrim was contacted with the tips of the filter media pleats, on one face of the filter media. (During this time the filter media was held at the desired pleat spacing with the aid of the above-described adhesive strands). Pressure was applied to the scrim to hold it in position against the pleat tips until the hot melt adhesive cooled and solidified. (Because the hot melt coater was only 16 inches wide, 16 inch strips and 8 inch strips were coated and were mounted on the filter media, abutted together, so as to cover the 20 inch width of the filter media). A similar procedure was performed to attach tridirectional scrim sections to the pleat tips of the other, opposite face of the filter media. In laminating the scrim sections to the upstream face of the filter media (that comprised the adhesive strands), some portion of some of the filaments were bonded to the above-described adhesive strands (e.g., where the adhesive strands traversed the top of the pleat tips) and other portions were bonded (directly) to the upstream pleat tips, as permitted by the flexibility of the scrim filaments.

The filter media comprising tridirectional scrim material on both sides and adhesive strands on the upstream side was then manually trimmed and framed to a size of approximately 20×25 inches. Thus in this manner a pleated filter of nominal dimensions 20×25×1 inches (actual thickness approximately 0.75 inches), with a pleat spacing of approximately 5 mm (i.e., approximately 5.1 pleats per inch), was provided.

The filter was loaded with a combination of 50 wt. % SAE Standard J26 fine test dust, available from Powder Technology Ltd (Derbyshire, England) and 50 wt. % talc (Target Brand Baby Powder from Target Corporation (Minneapolis, Minn.). The filter was loaded by manually sprinkling the mixture of dust and talc on the upstream face of filter, and then was inserted into a test duct and measured for pressure drop at an airflow velocity of 300 feet per minute (impinging on the upstream face of the filter). The targeted pressure drop was between about 0.50 and 0.55 inches of water. If the pressure drop was below about 0.50 inches of water, the filter was removed from the test duct and more dust/talc was applied to the filter. The loading/testing procedure was repeated until the desired range of 0.50 to 0.55 inches of water was achieved. Generally, the weight of dust/talc needed to achieve this pressure drop was between about 400 grams and 700 grams per filter. The filter was then replaced into the test duct (again with the upstream face of the filter facing the air flow) and exposed to an air flow velocity of 300 feet per minute (which for this filter, at this loading of particulates, corresponded to a pressure drop of approximately 0.50-0.55 inches of water, as described above). The air velocity was then increased to about 420 feet per minute, which corresponded to a pressure drop of approximately 0.65 inches of water. The filter was then cycled back and forth from an air velocity of zero to an air velocity of about 420 feet per minute for about twenty hours. Each complete cycle took about fifty seconds. In each cycle, the velocity was held at about 420 feet per minute for about forty seconds. During the remaining ten seconds of each cycle, the velocity was either zero feet per minute or was in the process of ramping up or ramping down.

After twenty hours of such exposure, the filter was then inspected for signs of bond failure between the scrim filaments and the pleat tips, bowing, buckling, and so on. Few signs of bowing, buckling and/or bond failure were observed.

A second filter, made identically as described above, was tested in a residential HVAC unit (home furnace). After two months of continuous air flow, the filter was inspected. Few signs of bowing, buckling and/or bond failure were observed.

The tests and test results described above are intended solely to be illustrative, rather than predictive, and variations in the testing procedure can be expected to yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather by the structures described by the language of the claims, and the equivalents of those structures. To the extent that there is a conflict or discrepancy between this specification and the disclosure in any document incorporated by reference herein, this specification will control.

What is claimed is:

1. A pleated filter comprising an upstream face and a downstream face, the filter comprising filter media with a plurality of oppositely-facing pleats comprising a plurality of upstream pleat tips and upstream pleat valleys and downstream pleat tips and downstream pleat valleys, the filter further comprising at least a first tridirectional, flexible, inextensible scrim in discontinuous contact with the downstream face of the filter and bonded to at least some of the downstream pleat tips.

2. The pleated filter of claim 1 further comprising a second tridirectional, flexible, inextensible scrim in discontinuous contact with the upstream face of the filter and bonded to at least some of the upstream pleat tips.

3. The pleated filter of claim 1 further comprising a continuous, substantially nonlinear adhesive strand provided on the upstream face of the filter, wherein the adhesive strand contacts the filter media at least at some of the upstream pleat tips and penetrates at least partially into at least some of the upstream pleat valleys.

4. The pleated filter of claim 3 wherein the continuous, substantially nonlinear adhesive strand is in discontinuous contact with the filter media.

5. The pleated filter of claim 3 wherein the tridirectional scrim is comprised of filaments and wherein some portions of some filaments of the tridirectional scrim are bonded directly to downstream pleat tips and some portions of some filaments of the tridirectional scrim are bonded to a portions of adhesive strands that are present upon downstream pleat tips.

6. The pleated filter of claim 3 further comprising a second tridirectional, flexible, inextensible scrim in discontinuous contact with the upstream face of the filter and bonded to at least some of the upstream pleat tips.

7. The pleated filter of claim 1 further comprising a continuous, substantially nonlinear adhesive strand provided on the downstream face of the filter, wherein the adhesive strand contacts the filter media at least at some of the downstream pleat tips and penetrates at least partially into at least some of the downstream pleat valleys.

8. The pleated filter of claim 7 further comprising a second tridirectional, flexible, inextensible scrim in discontinuous contact with the upstream face of the filter and bonded to at least some of the upstream pleat tips.

9. The pleated filter of claim 8 further comprising a continuous, substantially nonlinear adhesive strand provided on the upstream face of the filter, wherein the adhesive strand contacts the filter media at least at some of the upstream pleat tips and penetrates at least partially into at least some of the downstream pleat valleys.

10. The pleated filter of claim 1 wherein the filter media comprises a pleat direction and wherein the tridirectional scrim comprises a first set of parallel filaments that are oriented within plus or minus 5 degrees of 90 degrees to the pleat direction, a second set of parallel filaments that are oriented at an angle of between about 80 negative degrees and about 40 negative degrees from the orientation of the first set of filaments, and a third set of parallel filaments that are oriented at an angle of between about 80 positive degrees and about 40 positive degrees from the orientation of the first set of filaments.

11. The pleated filter of claim 10 wherein the first set of parallel filaments comprises a spacing between filaments of from around 4 mm to around 12 mm.

12. The pleated filter of claim 10 wherein the second and third sets of parallel filaments each comprise a spacing between filaments of from around 10 mm to around 30 mm.

13. The pleated filter of claim 10 wherein the spacing between filaments of the first set of filaments, between the spacing between filaments of the second set of filaments, and the spacing between filaments of the third set of filaments, are all equal.

14. The pleated filter of claim 10 wherein the tridirectional scrim comprises a first set of parallel filaments that are oriented within plus or minus 5 degrees of 90 degrees to the pleat direction, a second set of parallel filaments that are oriented at an angle of between about 76 negative degrees and about 60 negative degrees from the orientation of the first set of filaments, and a third set of parallel filaments that are oriented at an angle of between about 76 positive degrees and about 60 positive degrees from the orientation of the first set of filaments.

15. The pleated filter of claim 1 wherein the tridirectional scrim is comprised of filaments that each have a rectangular cross section with two major surfaces and wherein one major surface of each filament comprises the surface of that filament that is bonded to the pleat tips.

16. The pleated filter of claim 1 wherein the tridirectional scrim is comprised of filaments comprised of fiberglass fibers.

17. The pleated filter of claim 1 wherein the tridirectional scrim is comprised of filaments comprised of poly(ethylene terephthalate) fibers.

18. The pleated filter of claim 1 further comprising a frame member positioned at each edge of the filter, wherein each frame member comprises a U-shaped channel which covers at least a portion of each of the upstream face and the downstream face.

19. The pleated filter of claim 1 wherein the tridirectional scrim is comprised of filaments that are bonded to the pleat tips by way of a coated layer of bonding adhesive that is coated on a major surface of each of the filaments.

20. The pleated filter of claim 19 wherein the filaments each comprise a flattened cross sectional shape with the coated layer of bonding adhesive being coated on a major surface of each of the flattened filaments.

21. The pleated filter of claim 1 wherein the tridirectional scrim is comprised of filaments that exhibit an elongation at break of less than 20%.

* * * * *